US008707396B2

(12) United States Patent
Kim et al.

(10) Patent No.: US 8,707,396 B2
(45) Date of Patent: Apr. 22, 2014

(54) METHOD AND SYSTEM FOR PERFORMING RE-ASSOCIATION DUE TO HANDOVER IN A WLAN MESH NETWORK

(75) Inventors: Jae-Hoon Kim, Yongin (KR); Jung-Ho Kim, Yongin (KR); Ji Hoon Lee, Yongin (KR); Yong Sung Roh, Yongin (KR); Young Gon Choi, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1247 days.

(21) Appl. No.: 11/432,666

(22) Filed: May 12, 2006

(65) Prior Publication Data

US 2006/0282667 A1 Dec. 14, 2006

Related U.S. Application Data

(60) Provisional application No. 60/680,044, filed on May 12, 2005.

(30) Foreign Application Priority Data

Apr. 24, 2006 (KR) .......................... 10-2006-0036684

(51) Int. Cl.
| | |
|---|---|
| *G06F 15/173* | (2006.01) |
| *G06F 7/04* | (2006.01) |
| *H04W 36/00* | (2009.01) |
| *H04L 29/06* | (2006.01) |
| *H04L 12/56* | (2006.01) |

(52) U.S. Cl.
CPC .................. *H04L 63/08* (2013.01); *H04L 45/00* (2013.01); *H04W 36/0016* (2013.01)

USPC ................... 726/4; 726/3; 709/238; 709/242; 455/436; 455/437; 455/438; 455/439; 455/440; 455/441; 455/442; 455/443; 455/444

(58) Field of Classification Search
USPC ........................................................ 380/272
See application file for complete search history.

(56) References Cited

U.S. PATENT DOCUMENTS

| | | | |
|---|---|---|---|
| 5,081,679 A | * | 1/1992 | Dent ............................ 380/272 |
| 5,444,694 A | | 8/1995 | Millet et al. |

(Continued)

FOREIGN PATENT DOCUMENTS

| | | |
|---|---|---|
| KR | 10-0363944 | 12/2002 |
| KR | 10-2004-0042263 | 5/2004 |

(Continued)

OTHER PUBLICATIONS

Koodli, R. and Perkins, C. E. 2001. Fast handovers and context transfers in mobile networks. SIGCOMM Comput. Commun. Rev. 31, Oct. 5, 2001, 37-47.*
S. Pack and Y. Choi, "Fast Inter-AP Handoff Using Predictive-Authentication Scheme in a Public Wireless LAN," The joint conf. ICWLHN 2002 and ICN 2002, pp. 15-26, Aug. 2002.*
Pack, S. and Choi, Y. 2002. Pre-Authenticated Fast Handoff in a Public Wireless LAN Based on IEEE 802.1x Model. In Proceedings of the IFIP Tc6/Wg6.8 Working Conference on Personal Wireless Communications (Oct. 23-25, 2002). C. G. Omidyar, Ed. IFIP Conference Proceedings, vol. 234. Kluwer B.V., Deventer, The Netherlands, 175-182.*

(Continued)

*Primary Examiner* — Matthew Henning
(74) *Attorney, Agent, or Firm* — NSIP Law (57) ABSTRACT

A method and system for performing re-association in a WLAN mesh network are provided. A mobile node transmits authentication request information to an old node via a new node along with a mesh re-association request message for re-association of the mesh network. Upon receiving the mesh re-association request message, the old node performs re-association and authentication according to the mesh re-association request message, and transmits a mesh re-association reply message to the mobile node via the new node.

20 Claims, 4 Drawing Sheets

(56) References Cited

U.S. PATENT DOCUMENTS

| | | | | |
|---|---|---|---|---|
| 5,471,532 | A * | 11/1995 | Gardeck et al. | 380/272 |
| 6,147,966 | A | 11/2000 | Johnson et al. | |
| 7,356,001 | B1 * | 4/2008 | Jones et al. | 370/331 |
| 7,471,656 | B2 * | 12/2008 | Karoubalis et al. | 370/331 |
| 7,590,843 | B1 * | 9/2009 | Khalil et al. | 713/171 |
| 7,881,470 | B2 * | 2/2011 | Tan et al. | 380/255 |
| 2004/0240412 | A1 * | 12/2004 | Winget | 370/331 |
| 2005/0232179 | A1 * | 10/2005 | daCosta et al. | 370/315 |
| 2005/0271073 | A1 * | 12/2005 | Johnsen et al. | 370/428 |
| 2006/0009246 | A1 * | 1/2006 | Marinier et al. | 455/502 |
| 2007/0153739 | A1 * | 7/2007 | Zheng | 370/331 |
| 2007/0280169 | A1 * | 12/2007 | Cam Winget | 370/331 |
| 2008/0049674 | A1 | 2/2008 | Cha et al. | |

FOREIGN PATENT DOCUMENTS

| | | |
|---|---|---|
| KR | 10-2005-0078627 | 8/2005 |
| KR | 10-2006-0026708 | 3/2006 |
| WO | WO 01/26322 | 4/2001 |
| WO | WO 02/069550 | 9/2002 |

OTHER PUBLICATIONS

Noor Mustafa et al, "Pre-scanning and dynamic caching for fast handoff at MAC layer in IEEE 802.11 wireless LAN", IEEE International Conference on Mobile Adhoc and Sensor Systems Conference, Nov. 7-10, 2005.

Arunesh Mishra et al, "Context caching using neighbor graphs for fast handoffs in a wireless network", INFOCOM 2004. Twenty-third Annual Joint Conference of the IEEE Computer and Communications Societies, Mar. 2004.

Korean Office Action dated Feb. 25, 2013, issued in corresponding Korean Patent Application No. 10-2006-0036684 (and English Translation).

Korean Office Action issued Oct. 22, 2013 in counterpart Korean Patent Application No. 10-2006-0036684 (5 pages, in Korean with partial English translation).

* cited by examiner

METHOD AND SYSTEM FOR PERFORMING RE-ASSOCIATION DUE TO HANDOVER IN A WLAN MESH NETWORK

PRIORITY

This application claims the benefit under 35 U.S.C. §119 (e) of an application filed in the U.S. Patent and Trademark Office on May 12, 2005 and assigned Ser. No. 60/680,044, and claims the benefit under 35 U.S.C. §119(a) of an application filed in the Korean Intellectual Property Office on Apr. 24, 2006 and assigned Serial No. 2006-36684, the entire disclosures of which are hereby incorporated by reference.

BACKGROUND OF THE INVENTION

1. Field of the Invention

The present invention relates generally to a Wireless Local Area Network (WLAN) mesh network. More particularly, the present invention relates to a method and system for performing re-association due to the movement, such as, handover, of a mesh point in the network.

2. Description of the Related Art

A Local Area Network (LAN) is a set of personal terminals, main frames, and workstations connected to one another with a communication line of 300 meters or shorter. A LAN is also a high-speed communication network connected so that remotely installed equipment in which currents or radio signals between the personal terminals can be correctly delivered. For example, the equipment in the building of one institution can be efficiently shared by the entire staff. In the past, the wired networks that directly delivered the electric signals were mainly used as communication lines applied to the LAN. Due to the development of wireless protocols, the wired networks are increasingly replaced with wireless networks that deliver signals using radio waves. The LAN using the wireless network is generally called a Wireless Local Area Network (WLAN), or a wireless in-building information communication network, which is based on IEEE 802.11 proposed by the Institute of Electrical and Electronics Engineers (IEEE). The IEEE 802.11-based WLAN has grown at a fast rate in recent years, and is expected to make more rapid developments in the future due to its advantage of convenient network connection. As the demands for the high-speed wireless Internet increase rapidly, the existing WLAN system serves as an alternative to the infrastructure of the high-speed wireless public network.

The WLAN includes a plurality of access points (APs) connected via one distribution system (DS), and a plurality of stations (STAs) that receive services via the APs. Therefore, the AP serves as a bridge between terminals and the remainder of the network.

In a WLAN, the STA performs handover to a new AP from which it will newly receive the service when strength of a signal received from its current AP decreases due to its mobility. Therefore, in order to switch the service to the new AP, the STA needs authentication and re-association with the new AP. In this case, the STA performs handover from the old AP with which it has been communicating, to the new AP. The handover process will be described below with reference to FIG. 1.

Figure 1:
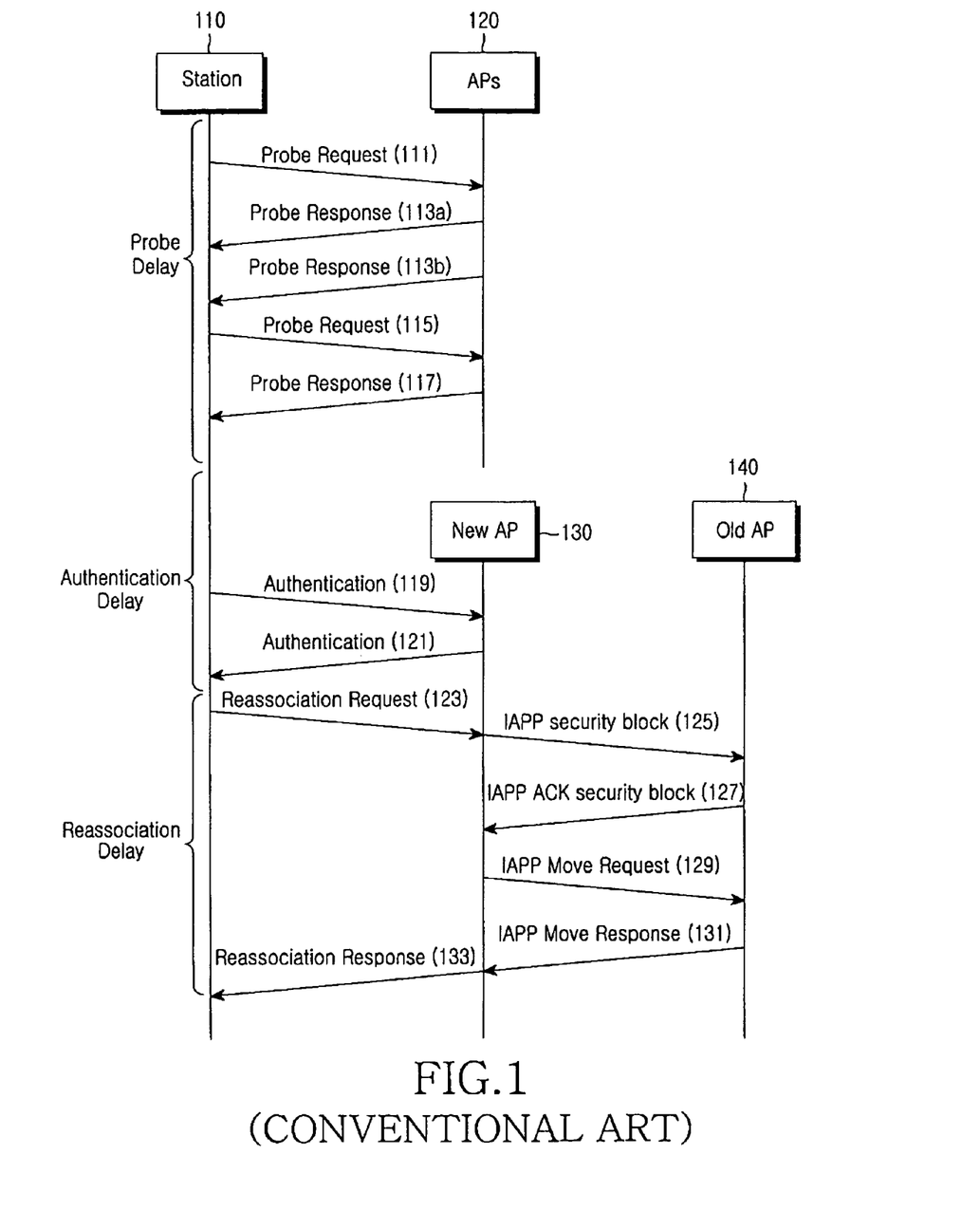
FIG. 1 is a signaling diagram schematically illustrating a handover procedure due to the movement of an STA in a general WLAN.

FIG. 1 is a signaling diagram schematically illustrating a handover procedure due to the movement of an STA in a general WLAN.

Referring to FIG. 1, a procedure is shown in which an STA 100 moves from an old AP 140 to a new AP 130. The STA 100, due to the movement, performs a Probe phase for asking each individual AP its opinion on the possibility of handover success.

The STA 100 sends a Probe Request message to a plurality of unspecified APs 120 in steps 111 and 115. Upon receiving the Probe Request message, the APs 120 transmit a Probe Response message to the STA 100 in step 113 and 117. The phrase "receiving the Probe Request message" means that the corresponding AP is adjacent to the mobile station (STA), so the AP can be assumed to be a latent AP. The Probe phase is repeatedly performed for each individual channel. The process of performing the Probe phase by changing the channel is shown in steps 115 and 117.

The STA 100 generates a priority list of the APs through the Probe phase. AP priorities are determined using strengths of signals received from the APs, by way of example.

The STA 100 performs an Authentication phase with the latent APs according to the priority list in steps 119 and 121. The STA 100 can perform the Authentication phase of requiring delivery of a credential and other state information from the old AP 140, via the new AP 130.

Next, the STA 100 performs a Re-association phase. The handover can be achieved through the Re-association phase and an Inter-Access Point Protocol (IAPP). Delivery of the state information is performed by the IAPP. The state information commonly refers to information that facilitates access to the network and the information includes information on a client's position and several accountings.

The STA 100 performs the Re-association phase based on the priorities of the latent APs registered in the priority list generated in the Probe phase. The STA 100 then transmits a Re-association Request message to the new AP 130 in step 123. The new AP 130 then performs an IAPP procedure with the old AP 140 through the other APs in steps 125, 127, 129 and 131. Through this procedure, the new AP 130 receives a credential allocated to the mobile station and other state information.

In step 133, the new AP 130 sends a Re-association Response message to the mobile station in response to the Re-association Request message.

As described above, the conventional handover procedure starts when the mobile station sends a Probe Request message, and ends when the mobile station receives a Re-association Response message. As a result, the handover procedure suffers from a probe delay, an authentication delay, and a re-association delay. The probe delay occurs in the Probe phase, the authentication delay occurs in the Authentication phase, and the re-association delay occurs in the Re-association phase.

First, the probe delay occurs while the STA 100 transmits a Probe Request message and waits for a response thereto for each individual AP in each channel. The time for which the mobile station waits for the response in a particular channel after transmitting the Probe Request message is called a probe-wait delay. This is determined based on a time difference with the next transmitted Probe Request message. As a result, the traffic in the channels and timing of the Probe Response message may affect the probe-wait time.

Second, the authentication delay occurs while an exchange of Authentication frames is made. The authentication includes two or four consecutive frames according to an authentication method used by the AP. Several wireless Network Interface Cards (NICs) attempt re-association before the authentication. However, the attempted re-association causes an additional delay in the handover process.

Third, the re-association delay occurs while an exchange of Re-association frames is made. If the Authentication phase is successfully achieved, the mobile station sends a Re-association Request frame to the AP and receives a Re-association Response frame in response to the request. This completes the handover. Meanwhile, the inclusion of the IAPP phase additionally required between the new AP and the other APs will further increase the re-association delay.

The mobile station suffers multiple delays in the process of performing handover between APs in the conventional WLAN. This affects the quality of service (QoS) and makes it impossible to perform fast handover.

Accordingly, there is a need for an improved system and method for providing a re-association method for minimizing a service delay due to handover in a WLAN mesh network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a re-association method for minimizing a service delay due to handover in a WLAN mesh network.

It is another object of exemplary embodiments of the present invention to provide a re-association method and system for minimizing an authentication delay and a re-association delay due to handover in a WLAN mesh network.

According to one aspect of an exemplary embodiment of the present invention, a method and system for performing re-association due to handover of a mobile node in a wireless local area network (WLAN) mesh network are provided. Authentication request information is transmitted along with a mesh re-association request message for re-association of a mesh network. A mesh re-association reply message is received including an authentication reply to an authentication request corresponding to the mesh re-association request message and a re-association phase is performed according to the received mesh re-association reply message.

According to another aspect of an exemplary embodiment of the present invention, a method and system for performing re-association due to handover by a new node in a wireless local area network (WLAN) mesh network are provided. A first mesh re-association request message is received. A second mesh re-association request message is generated including moving information and authentication requests of corresponding nodes that transmitted the first mesh re-association request message and the second mesh re-association request message is transmitted. A first mesh re-association reply message is received in reply to the second mesh re-association request message, a determination is made as to whether there is an authentication reply to an authentication request, and a second mesh re-association reply message is generated including the authentication reply. The second mesh re-association reply message is then transmitted to a corresponding node that transmitted the first mesh re-association request message.

According to another aspect of an exemplary embodiment of the present invention, a method and system for performing re-association due to handover by an old node in a wireless local area network (WLAN) mesh network are provided. A mesh re-association request message is received, authentication is performed on a corresponding node in reply to an authentication request included in the mesh re-association request message, and a mesh re-association reply message is generated including an authentication reply provided according to the authentication result, and the mesh re-association reply message is transmitted in reply to the mesh re-association request message.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a re-association system and method for a Wireless Local Area Network (WLAN) mesh network. In particular, an exemplary embodiment of the present invention provides an apparatus and method for simultaneously performing authentication while performing re-association due to the movement of a mesh point in a WLAN mesh communication system. It will be assumed that the WLAN mesh network follows Institute of Electrical and Electronics Engineers (IEEE) 802.11s standard.

Among IEEE 802.11 standards, the 802.11s standard does not require cabling between the current access points (APs). The WLAN network defined in the IEEE 802.11s standard will be defined as a WLAN mesh network. As the IEEE 802.11s standard defines the connection between networks, the WLAN mesh network can be easily installed at a lower cost in areas where the installation of a conventional WLAN can be difficult. The WLAN mesh network can easily be installed in city environments such as downtown areas.

The WLAN mesh network includes a plurality of nodes that exchange data with each other. The nodes each include a plurality of terminals, or stations (STAs), a plurality of mesh points (MPs), and a plurality of mesh access points (MAPs). The MP supports mesh service, and the MAP. The MAP is a special type of the MP which provides the mesh service and AP service.

Although exemplary embodiments of the present invention will be described with reference to movement of the MP, an exemplary embodiment of the present invention can also be applied to every node capable of performing a Re-association phase.

Figure 2:
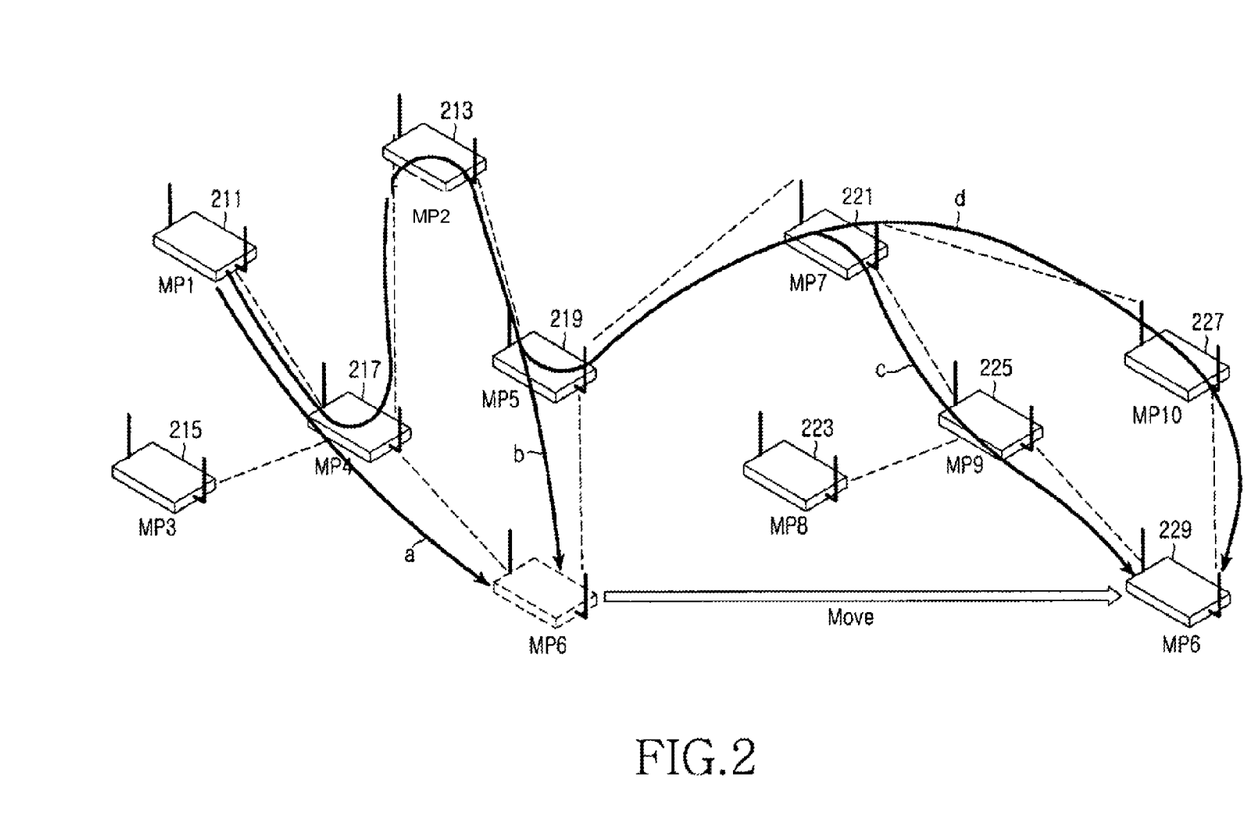
FIG. 2 is a diagram schematically illustrating data flow due to the movement of a mesh point (MP) in a WLAN mesh network according to an exemplary embodiment of the present invention.

FIG. 2 is a diagram schematically illustrating a data flow due to the movement of an MP in a WLAN mesh network according to an exemplary embodiment of the present invention.

A description of FIG. 2 is made for cases in which an exemplary embodiment of the present invention can be applied to a plurality of MPs and an MP1 211 transmits data to an MP6 229.

It will be assumed that the MP6 229 has previously received data service via an MP4 217 or an MP5 219 to transmit/receive data of the MP1 211. As the MP6 229 moves, it should perform handover. For example, the MP6 229 should change the MP from which it receives the service, in order to receive data of the MP1 211. In this process, the MP4 217 or the MP5 219 that has previously provided the service to the MP6 229 becomes an old MP, and an MP9 225 or an MP10 227 from which the MP6 229 will newly receive the service becomes a new MP.

The MP6 229 performs a Probe phase in which it asks each individual MP its opinion on the possibility of handover success possibility. For example, an inquiry is made regarding the possibility of MP change success, in order to newly receive the data service from the new MP.

The Probe phase is similar in operation to the Probe phase described in the Related Art section.

The MP9 225 or the MP10 227, selected according to their priorities determined in the Probe phase in the method described above, performs an Authentication phase and a Re-association phase with the WLAN mesh network.

As a result, through the Probe phase, the Authentication phase and the Re-association phase, the MP6 229 can perform the service for the MP1 211 via the new routes of 'MP 1->MP 4->MP 2->MP 5->MP 7->MP 9->MP6' and 'MP 1->MP 4->MP 2->MP 5->MP 7->MP 10->MP6', instead of the old routes of 'MP 1->MP 4->MP 6' and 'MP 1->MP 4->MP 2->MP6'.

In order to simultaneously perform the Authentication phase and the Re-association phase, an exemplary embodiment of the present invention includes a phase of allowing the old MP to perform the Authentication phase for the new MP. With reference to FIG. 2, a description will now be made of the Re-association phase according to an exemplary embodiment of the present invention.

Figure 3:
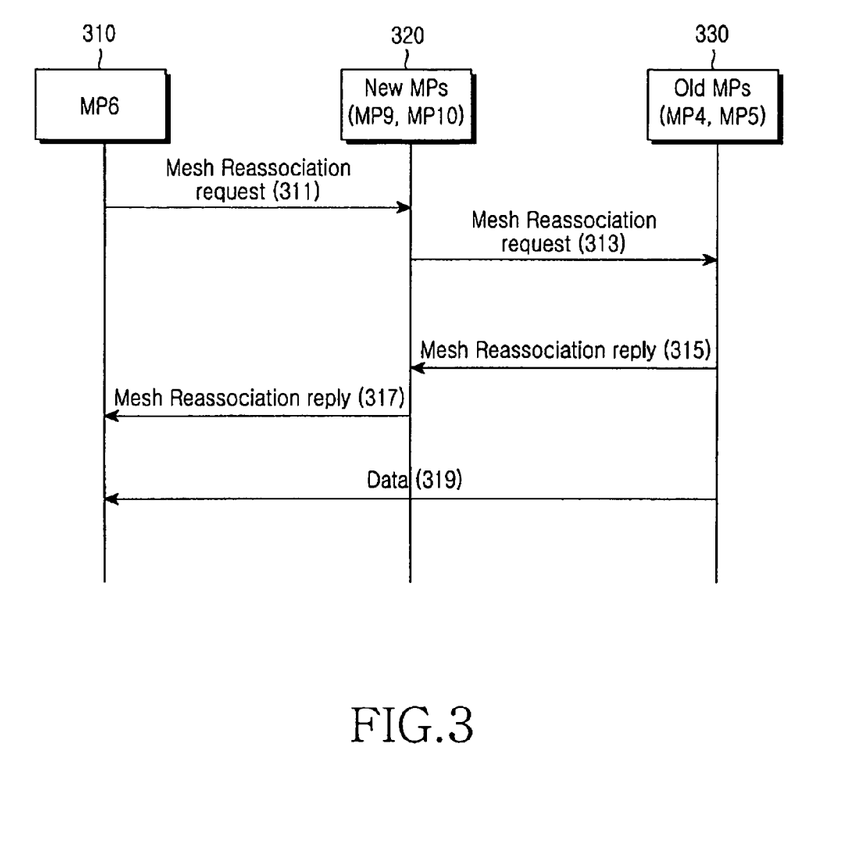
FIG. 3 is a signaling diagram illustrating a Re-association phase due to the movement of an MP in a WLAN mesh network according to an exemplary embodiment of the present invention.

FIG. 3 is a signaling diagram illustrating a Re-association phase due to the movement of an MP in a WLAN mesh network according to an exemplary embodiment of the present invention.

Referring to FIG. 3, a position-changed (such as, moved) MP6 310, a new MP (MP9 or MP10) 320, and an old MP (MP4 or MP5) 330 are shown.

The MP6 310 transmits data to at least one new MP 320 on a unicast basis, without performing the Re-association phase with a plurality of NPs. The MP6 310 transmits a Mesh Re-association Request message for performing the Re-association phase in step 311. The Mesh Re-association Request message includes an Authentication request and an Old MP list.

Upon receiving the Mesh Re-association Request message, the new MP 320 forwards the Mesh Re-association Request message to the old MP 330 based on the Old MP list included in step 313. In this case, the new MP 320 provides information on the moved MP6 310 to the old MP 330 along with the Mesh Re-association Request message. The new MP 320 also sends a request for establishment of a route from the new MP, such as, MP9 or MP10, of the MP6 310 to the old MP 330.

The old MP 330 which receives the Mesh Re-association Request message transmitted by the new MP 320, performs an authentication corresponding to the Authentication request of the MP6 310 and performs a routing table update for data transmission, such as, packet transmission, to the MP6 310.

The old MP 330 manages a re-association table for the MP6 310. The re-association table refers to a table including a list generated so that MPs exchange Re-association Request/Reply messages with each other, and register counterpart information to facilitate future communication.

Therefore, after receiving the re-association table of the MP6 310 through the Mesh Re-association Request message, the old MP 330 manages an MP6 entry, such as, information on the MP6 310, in a postponement state for a predetermined time. This is done without immediately discarding the MP6 entry. The re-association table is managed in the postponement state for a predetermined time without immediately discarding the M6 entry so that a packet loss can be prevented by storing information given until completion of the re-association because the packets to be transmitted to the MP6 310 are transmitted to the old MP 330 until the completion of the re-association.

After receiving the Mesh Re-association Request message, the old MP 330 establishes a route up to the MP6 310 that passes through the new MP 320, such as, MP9 or MP10, using a routing table for the MP6 310.

The old MP 330 manages the routing table update and the re-association table, and transmits a Mesh Re-association Reply message to the new MP 320 in response to the Mesh Re-association Request message in step 315.

The new MP 320 determines whether the MP6 310 has passed the authentication, using Mesh Re-association Reply message, and forwards the Mesh Re-association Reply message to the MP6 310 according to the determination result in step 317.

After the Re-association phase, the MP6 310 receives data through the old MP 330, such as, the MP5, in step 319.

Advantageously, the MPs can request the Authentication phase and the Re-association phase through the Mesh Re-association Request message and can also simultaneously perform the Authentication phase and the Re-association phase using the Mesh Re-association Request message.

Figure 4:
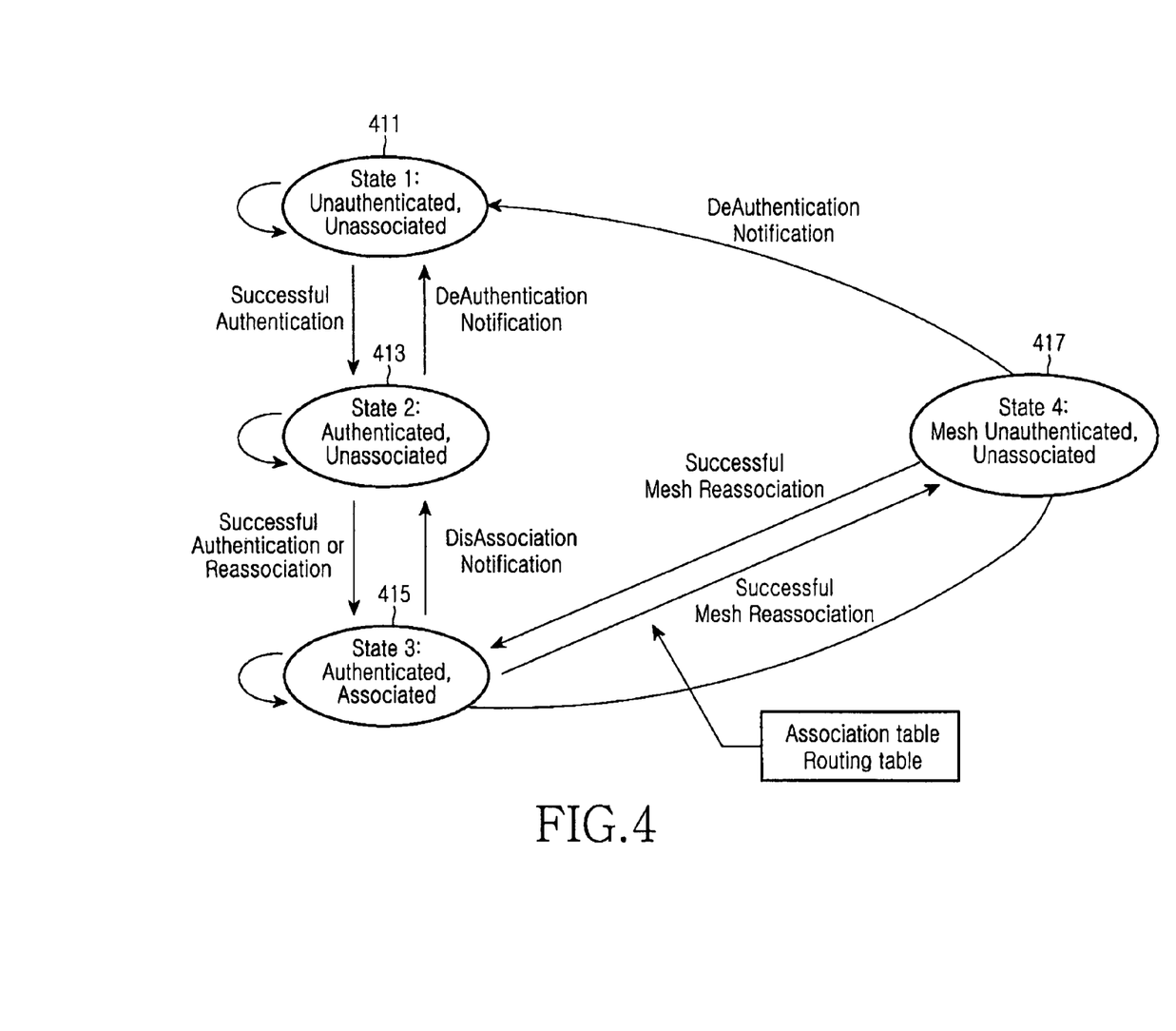
FIG. 4 is a state diagram illustrating a Re-association phase due to the movement of an MP in a WLAN mesh network according to an exemplary embodiment of the present invention.

FIG. 4 is a state diagram illustrating a Re-association phase due to the movement of an MP in a WLAN mesh network according to an exemplary embodiment of the present invention.

Referring to FIG. 4, step 411 represents State 1 in which a moving MP is unauthenticated and unassociated. Step 413 represents State 2 in which the moving MP is authenticated but is unassociated. Step 415 represents State 3 in which the moving MP is authenticated and associated. Step 417 represents State 4 in which the moving MP is mesh-unauthenticated and mesh-unassociated.

The conventional re-association is achieved in order of 'State 1->State 2->State 3' for the authentication and the re-association. If the moving MP passes the authentication in State 1, it transitions to State 2, and if the moving MP succeeds in both the authentication and the re-association in State 2, it transitions to State 3. However, if the moving MP fails in the re-association in State 3, it transitions to State 2, and if the moving MP fails in the authentication in State 2, it transitions to State 1.

However, an exemplary embodiment of the present invention proposes State 4 to perform a Mesh Re-association phase including the Authentication phase which makes it possible to perform service through simplified state transition. In an exemplary embodiment of the present invention, the states are reduced in number to two states of 'State 4->State 3', and the authentication is performed by the old MP instead of the new MP. As a result, it is possible to perform re-association through a plurality of MPs and the above phases in the WLAN mesh network, using the existing method.

As illustrated in FIG. 4, if the moving MP succeeds in the authentication and the re-association in State 4, it transitions to State 3. However, if the moving MP fails in the authentication in State 4, it transitions to State 1.

As can be understood from the foregoing description, in the WLAN mesh network, an exemplary embodiment of the present invention simultaneously performs the Authentication phase during re-association, thereby minimizing a possible handover delay. In addition, an exemplary embodiment of the present invention can minimize a service delay and overhead caused by the movement of a node, especially an MP in the WLAN mesh network.

While the present invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for performing re-association according to handover by a mobile node in a wireless local area network (WLAN) mesh network, the method comprising:
    transmitting, to at least one new node adjacent to the mobile node, a mesh re-association request message for re-association of the WLAN mesh network to establish a route among the mobile node, the at least one new node, and an old node, the mesh re-association request message comprising authentication request information for authentication of the mobile node;
    receiving, from the at least one new node, a mesh re-association reply message comprising an authentication reply to an authentication request, in response to the mesh re-association request message; and
    receiving data using an established route,
    wherein the at least one new node transmits to the old node moving information of the mobile node and the authentication request information, and requests to the old node the authentication and the re-association of the mobile node,
    wherein the old node simultaneously performs the authentication of the mobile node with respect to the WLAN mesh network, and the re-association of the mobile node with respect to the WLAN mesh network, and simultaneously establishes the route among the old node, one or more intermediate mesh nodes between the old node and the at least one new node, and the at least one new node, based on the moving information received from the at least one new node,
    wherein the old node is a node from which the mobile node has previously received data, and the at least one new node is at least one node from which the mobile node desires to receive data, and
    wherein the re-association is performed to establish the route based on a re-association table of the mobile node managed by the old node, the re-association table comprising information on nodes that are able to communicate with the old node.

2. The method of claim 1, wherein the mesh re-association request message comprises information on the old node.

3. The method of claim 1, wherein the mesh re-association request message is transmitted to the at least one new node on a unicast basis.

4. A method for performing re-association according to handover of a mobile node, by a new node in a wireless local area network (WLAN) mesh network, the method comprising:
    receiving, from the mobile node, a first mesh re-association request message for re-association of the WLAN mesh network to establish a route among the mobile node, the new node, and an old node, the first mesh re-association request message comprising authentication request information for authentication of the mobile node;
    generating a second mesh re-association request message for requesting to the old node the re-association and the authentication of the mobile node, the second mesh re-association message comprising moving information of the mobile node and the authentication request information;
    transmitting the second mesh re-association request message to the old node;
    receiving, from the old node, a first mesh re-association reply message in reply to the second mesh re-association request message;
    determining whether there is authentication reply information to the authentication request information;
    generating a second mesh re-association reply message comprising the authentication reply information; and
    transmitting the second mesh re-association reply message to the mobile node,
    wherein the old node simultaneously performs the authentication of the mobile node with respect to the WLAN mesh network and the re-association of the mobile node with respect to the WLAN mesh network, and simultaneously establishes the route among the old node, one or more intermediate mesh nodes between the old node and the new node, and the new node, based on the moving information received from the new node,
    wherein the old node is a node from which the mobile node has previously received a service, and the new node is a node from which the mobile node desires to receive data, and
    the re-association is performed to establish the route based on a re-association table of the mobile node managed by the old node, the re-association table comprising information on nodes that are able to communicate with the old node.

5. The method of claim 4, wherein the first mesh re-association request message comprises information on the old node.

6. The method of claim 5, further comprising transmitting, to the old node, a route establishment request message for establishment of a route to the new node along with the second mesh re-association request message to establish a route to the mobile node.

7. A method for performing re-association according to handover of a mobile node, by an old node in a wireless local area network (WLAN) mesh network, the method comprising:

receiving, from at least one new node adjacent to the mobile node, a mesh re-association request message for requesting authentication of the mobile node and a re-association of the WLAN mesh network to establish a route among the mobile node, the at least one new node, and the old node, the mesh re-association request message comprising moving information of the mobile node and authentication request information for the authentication of the mobile node;

simultaneously authenticating the mobile node with respect to the WLAN mesh network and re-associating the mobile node with respect to the WLAN mesh network, based on the received mesh re-association request message, and simultaneously establishes the route among the old node, one or more intermediate mesh nodes between the old node and the at least one new node, and the at least one new node, based on the moving information received from the at least one new node;

generating a mesh re-association reply message comprising authentication reply information according to a result of the authentication; and transmitting, to the at least one new node, the mesh re-association reply message in reply to the mesh re-association request message, wherein the old node is a node from which the mobile node has previously received data, and the at least one new node is at least one node from which the mobile node desires to receive data, and the re-association is performed to establish the route based on a re-association table of the mobile node managed by the old node, the re-association table comprising information on nodes that are able to communicate with the old node.

8. The method of claim 7, further comprising:
updating a routing table for data transmission; and
establishing a route to the at least one new node using the updated routing table, according route establishment request, the mesh re-association request message comprising the route establishment request.

9. The method of claim 7, further comprising managing a corresponding entry of a re-association table for the mobile node in a postponement state for a reference time after receiving the mesh re-association request message.

10. The method of claim 9, wherein the reference time comprises a time interval up to a time at which the re-association is completed.

11. A mobile node for performing re-association according to handover of the mobile node in a wireless local area network (WLAN) mesh network, the mobile node comprising:
a transmitter configured to transmit, to at least one new node adjacent to the mobile node, a mesh re-association request message for re-association of the WLAN mesh network to establish a route among the mobile node, the at least one new node, and an old node, the mesh re-association request message comprising authentication request information for authentication of the mobile node; and
a receiver configured to receive, from the at least one new node, a mesh re-association reply message comprising an authentication reply to an authentication request, in response to the mesh re-association request message, and receiving data using a established route, when the re-association is performed according to the mesh re-association reply message,
wherein the at least one new node transmits to the old node moving information of the mobile node and the authentication request information, and requests to the old node the authentication and the re-association of the mobile node,
wherein the old node simultaneously performs the authentication of the mobile node with respect to the WLAN mesh network and the re-association of the mobile node with respect to the WLAN mesh network, and simultaneously establishes the route among the old node, one or more intermediate mesh nodes between the old node and the at least one new node, and the at least one new node, based on the moving information received from the at least one new node,
wherein the old node is a node from which the mobile node has previously received a data, and the at least one new node is at least one node from which the mobile node desires to receive data, and
wherein the re-association is performed to establish the route based on a re-association table of the mobile node managed by the old node, the re-association table comprising information on nodes that are able to communicate with the old node.

12. The mobile node of claim 11, wherein the mesh re-association request message comprises information on the old node.

13. The mobile node of claim 11, wherein the mesh re-association request message is transmitted to the at least one new node on a unicast basis.

14. A new node for performing re-association according to handover of a mobile node in a wireless local area network (WLAN) mesh network, the method comprising:
a receiver configured to receive, from the mobile node, a first mesh re-association request message for re-association of the WLAN mesh network to establish a route among the mobile node, the new node, and an old node, the first mesh re-association request message comprising authentication request information for authentication of the mobile node, and receive, from the old node, a first mesh re-association reply message in reply to the second mesh re-association request message;
a transmitter configured to transmit, to the old node, a second mesh re-association request message for requesting to the old node the re-association and authentication of the mobile node, the second mesh re-association request message comprising moving information of the mobile node and the authentication request information, and transmit, to the mobile node, a second mesh re-association reply message comprising the authentication reply information; and
a controller configured to generate the second mesh re-association request message, when the first mesh re-association request message is received, control the transmitter for transmitting the second mesh re-association request message to the old node, determine whether there is authentication reply information to the authentication request information, when the first mesh re-association reply message is received, generating the second mesh re-association reply message, and control the transmitter for transmitting the second mesh re-association reply message to the mobile node,
wherein the old node simultaneously performs the authentication of the mobile node with respect to the WLAN mesh network and the re-association of the mobile node with respect to the WLAN mesh network, and simultaneously establishes the route among the old node, one or more intermediate mesh nodes between the old node and the new node, and the new node, based on the moving information received from the new node, the old node is a node from which the mobile node has previously received a service, and the new node is a node from which the mobile node desires to receive data, and the re-association is performed to establish the route based on a re-association table of the mobile node managed by the old node, the re-association table comprising information on nodes that are able to communicate with the old node.

15. The new node of claim 14, wherein the first mesh re-association request message comprises information on the old node.

16. The new node of claim 15, wherein the transmitter transmits, to the old node, a route establishment request message for establishment of a route to the new node along with the second mesh re-association request message to establish a route to the mobile node.

17. An old node for performing re-association according to handover of a mobile node in a wireless local area network (WLAN) mesh network, the method comprising:

a receiver configured to receive, from at least one new node adjacent to the mobile node, a mesh re-association request message for requesting authentication of the mobile node and a re-association of the WLAN mesh network to establish a route among the mobile node, the at least one new node, and the old node, the mesh re-association request message comprising moving information of the mobile node and authentication request information for the authentication of the mobile node;

a controller configured to simultaneously perform the authentication of the mobile node with respect to the WLAN mesh network and the re-association of the mobile node with respect to the WLAN mesh network, based on the authentication request information, to simultaneously establish the route among the old node, one or more intermediate mesh nodes between the old node and the at least one new node, and the at least one new node, based on the moving information received from the at least one new node, and to generate a mesh re-association reply message comprising authentication reply information according to a result of the authentication; and a transmitter configured to transmit, to the at least one new node, the mesh re-association reply message in reply to the mesh re-association request message, wherein the old node is a node from which the mobile node has previously received data, and the at least one new node is at least one node from which the mobile node desires to receive data, and the re-association is performed to establish the route based on a re-association table of the mobile node managed by the old node, the re-association table comprising information on nodes that are able to communicate with the old node.

18. The old node of claim 17, wherein the controller updates a routing table for data transmission, and establishes a route to the at least one new node using the updated routing table, according route establishment request, the mesh re-association request message comprising the route establishment request.

19. The old node of claim 17, wherein the controller manages a corresponding entry of a re-association table for the mobile node in a postponement state for a reference time after receiving the mesh re-association request message.

20. The old node of claim 19, wherein the reference time comprises a time interval up to a time at which the re-association is completed.

* * * * *